(12) United States Patent
Wendt et al.

(10) Patent No.: US 10,705,529 B2
(45) Date of Patent: Jul. 7, 2020

(54) AUTONOMOUS ALL-TERRAIN VEHICLE (ATV)

(71) Applicant: Honda Motor Co., Ltd., Tokyo (JP)

(72) Inventors: Pete Wendt, Redondo Beach, CA (US); Paul Andrew Konasewich, San Mateo, CA (US)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 15/915,174

(22) Filed: Mar. 8, 2018

(65) Prior Publication Data

US 2019/0212745 A1    Jul. 11, 2019

Related U.S. Application Data

(60) Provisional application No. 62/613,940, filed on Jan. 5, 2018.

(51) Int. Cl.
| | |
|---|---|
| *G05D 1/02* | (2020.01) |
| *G01C 21/34* | (2006.01) |
| *G01C 21/36* | (2006.01) |
| *G05D 1/00* | (2006.01) |
| *G01C 21/20* | (2006.01) |

(52) U.S. Cl.
CPC .......... *G05D 1/0212* (2013.01); *G01C 21/20* (2013.01); *G01C 21/3415* (2013.01); *G01C 21/362* (2013.01); *G01C 21/3602* (2013.01); *G01C 21/3664* (2013.01); *G05D 1/0016* (2013.01); *G05D 1/024* (2013.01); *G05D 1/0278* (2013.01); *B60Y 2200/124* (2013.01); *G05D 2201/0213* (2013.01)

(58) Field of Classification Search
CPC ............ G01C 21/3415; G01C 21/3602; G01C 21/362; G01C 21/3664; G05D 1/0016; G05D 1/024; G05D 1/0278
USPC .......................................................... 701/2
See application file for complete search history.

(56) References Cited

U.S. PATENT DOCUMENTS

| | | | |
|---|---|---|---|
| 7,053,580 B2 | 5/2006 | Aldred | |
| 8,789,638 B2 | 7/2014 | Zhang et al. | |
| 8,989,972 B2 * | 3/2015 | Anderson | A61B 5/6804 |
| | | | 701/301 |
| 2004/0267411 A1 | 12/2004 | Mayer et al. | |
| 2006/0178823 A1 | 8/2006 | Eglington et al. | |

(Continued)

FOREIGN PATENT DOCUMENTS

EP          0971276          1/2000

*Primary Examiner* — Maceeh Anwari
(74) *Attorney, Agent, or Firm* — Rankin, Hill & Clark LLP

(57) ABSTRACT

According to one aspect, an autonomous all-terrain vehicle (ATV) includes a controller, a location unit, a navigation module, and a drive controller. The controller receives a 'remember path' command and in response, the location unit determines a location associated with the autonomous ATV and a path being travelled by a leader device. The navigation module determines a first route for the autonomous ATV based on the path being travelled by the leader device and stores the first route for the autonomous ATV as a first preset route based on the received 'remember path' command. The navigation module determines a second route for the autonomous ATV based on the received 'recall path' command and the stored first preset route. The controller controls a drive controller of the autonomous ATV based on the determined second route.

15 Claims, 10 Drawing Sheets

(56) References Cited

U.S. PATENT DOCUMENTS

| | | |
|---|---|---|
| 2012/0271489 A1 | 10/2012 | Roberts et al. |
| 2016/0327959 A1 | 11/2016 | Brown et al. |
| 2017/0017234 A1 | 1/2017 | Wilson |
| 2017/0225679 A1 | 8/2017 | Bonnet et al. |

* cited by examiner

AUTONOMOUS ALL-TERRAIN VEHICLE (ATV)

CROSS-REFERENCE TO RELATED APPLICATIONS

This application claims the benefit of U.S. Provisional Patent Application, Ser. No. 62/613,940 entitled "AUTONOMOUS ALL-TERRAIN VEHICLE (ATV)", filed on Jan. 5, 2018; the entirety of the above-noted application(s) is incorporated by reference herein.

BACKGROUND

An autonomous vehicle is an unmanned vehicle which is generally capable of sensing its environment and navigating without input from a driver. An autonomous vehicle may perform autonomous driving by recognizing and determining surrounding environments through various sensors attached to the autonomous vehicle. Further, an autonomous vehicle may enable a destination to be set and move to the set destination via autonomous driving.

BRIEF DESCRIPTION

According to one aspect, an autonomous all-terrain vehicle (ATV) may include a controller, a location unit, and a navigation module. The controller may receive a 'remember path' command. The location unit may determine a location associated with the autonomous ATV and determine a path being travelled by a leader device. The navigation module may determine a first route for the autonomous ATV based on the path being travelled by the leader device and stores the first route for the autonomous ATV as a first preset route based on the received 'remember path' command.

The controller may receive a 'recall path' command and the navigation module may determine a second route for the autonomous ATV based on the received 'recall path' command and the stored first preset route. The controller may control a drive controller of the autonomous ATV based on the determined second route. The second route may be shaped identically to the first route.

The autonomous ATV may include a sensor module detecting an obstacle in an operating environment through which the autonomous ATV is travelling. The navigation module may determine whether the obstacle impedes a current route of the autonomous ATV. The navigation module may determine an alternative current route for the autonomous ATV based on the current route, whether the obstacle impedes the current route of the autonomous ATV, and a feature of the operating environment. The current route may be the first route or a second route associated with a 'recall path' command. The sensor module may include a light detection and ranging (LIDAR) sensor. The location unit may include a global positioning system (GPS) unit.

The autonomous ATV may include a hardware button associated with the 'remember path' command and a hardware button associated with a 'recall path' command. The autonomous ATV may include a hardware button associated with a 'follow' command, wherein the navigation module determines the first route for the autonomous ATV based on receiving the 'follow' command.

According to one aspect, an autonomous all-terrain vehicle (ATV) may include an interface, a controller, a location unit, and a navigation module. The interface may include a button associated with a 'remember path' command. The controller may receive the 'remember path' command based on a press of the button. The location unit may determine a location associated with the autonomous ATV and determine a path being travelled by a leader device. The navigation module may determine a first route for the autonomous ATV based on the path being travelled by the leader device and store the first route for the autonomous ATV as a first preset route based on the received 'remember path' command.

The controller may receive a 'recall path' command and the navigation module may determine a second route for the autonomous ATV based on the received 'recall path' command and the stored first preset route. The controller may control a drive controller of the autonomous ATV based on the determined second route.

The autonomous ATV may include a sensor module detecting an obstacle in an operating environment through which the autonomous ATV is travelling and the navigation module may determine whether the obstacle impedes a current route of the autonomous ATV. The navigation module may determine an alternative current route for the autonomous ATV based on the current route, whether the obstacle impedes the current route of the autonomous ATV, and a feature of the operating environment.

According to one aspect, an autonomous all-terrain vehicle (ATV) may include a communications module, a controller, a location unit, and a navigation module. The communications module may receive a 'remember path' command from a remote device. The controller may receive the 'remember path' command from the communications module. The location unit may determine a location associated with the autonomous ATV and determine a path being travelled by a leader device. The navigation module may determine a first route for the autonomous ATV based on the path being travelled by the leader device and store the first route for the autonomous ATV as a first preset route based on the received 'remember path' command.

The controller may receive a 'recall path' command, the navigation module may determine a second route for the autonomous ATV based on the received 'recall path' command and the stored first preset route, and the controller may control a drive controller of the autonomous ATV based on the determined second route. The second route may be shaped identically to the first route.

The autonomous ATV may include a sensor module detecting an obstacle in an operating environment through which the autonomous ATV is travelling and the navigation module may determine whether the obstacle impedes a current route of the autonomous ATV. The navigation module may determine an alternative current route for the autonomous ATV based on the current route, whether the obstacle impedes the current route of the autonomous ATV, and a feature of the operating environment. The current route may be the first route or a second route associated with a 'recall path' command.

DETAILED DESCRIPTION

Figure 1:
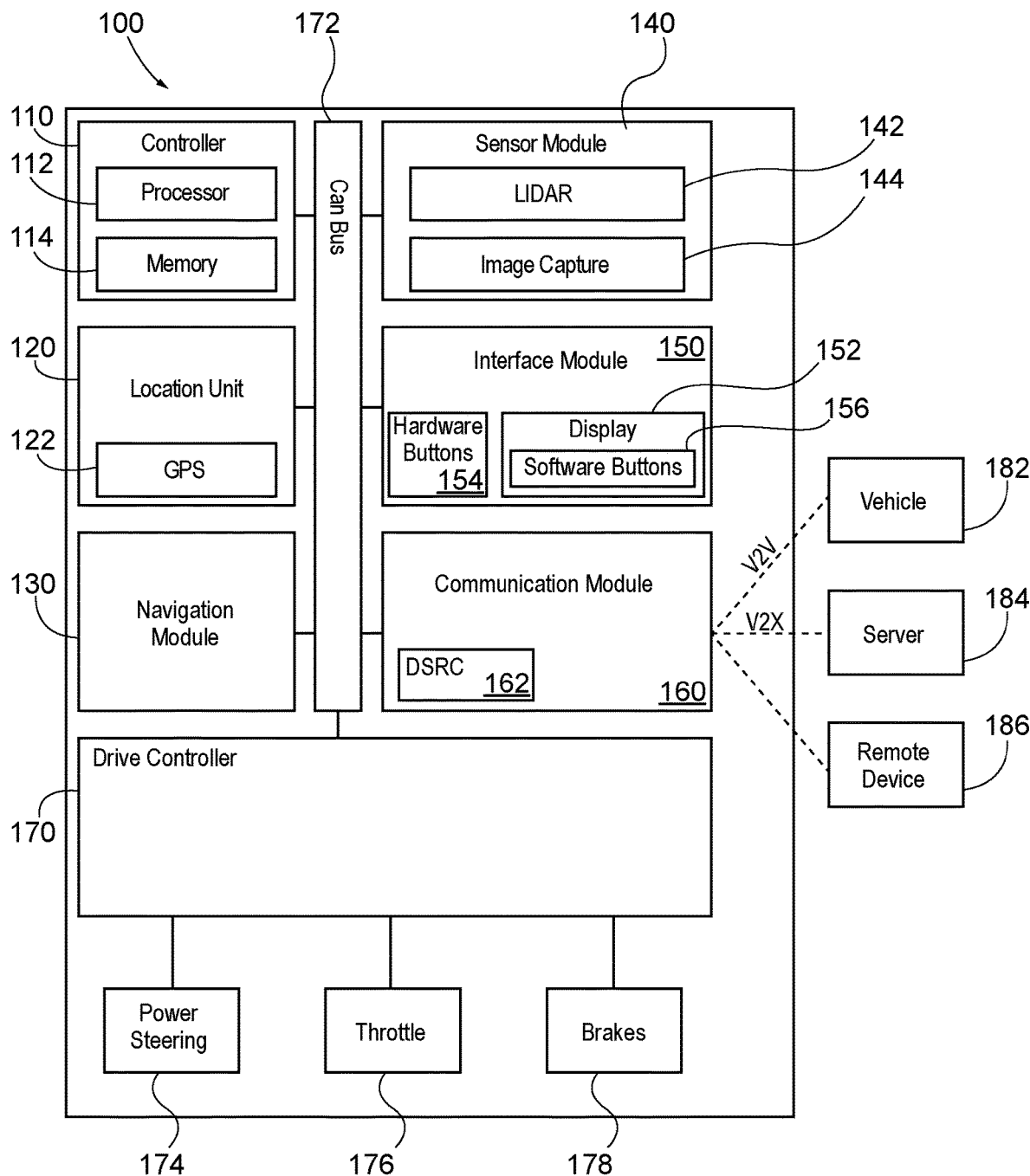
FIG. 1 is an illustration of an exemplary component diagram of a system for operation of an autonomous all-terrain vehicle (ATV), according to one aspect.

The following terms are used throughout the disclosure, the definitions of which are provided herein to assist in understanding one aspect of the disclosure.

"Vehicle", as used herein, refers to any moving vehicle that is capable of carrying one or more human occupants and is powered by any form of energy. In some cases, a motor vehicle includes one or more engines. The term "vehicle" may also refer to an autonomous vehicle and/or self-driving vehicle powered by any form of energy. The autonomous vehicle may carry one or more human occupants or other cargo. Further, the term "vehicle" may include vehicles that are automated or non-automated with pre-determined paths or free-moving vehicles.

"Obstacle", as used herein, refers to any objects in a roadway or along a path being travelled by the vehicle and may include pedestrians, other vehicles, animals, debris, potholes, etc. Further, an 'obstacle' may include most any traffic condition, road condition, weather condition, features of the environment, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which the vehicle is travelling or is projected to travel along.

"Module", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may include logic, a software controlled microprocessor, a discrete logic circuit, an analog circuit, a digital circuit, a programmed logic device, a memory device containing executing or executable instructions, logic gates, a combination of gates, and/or other circuit components, such as the modules, systems, devices, units, or any of the components of FIG. 1. Multiple modules may be combined into one module and single modules may be distributed among multiple modules.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", as used herein, or a connection by which entities are "operably connected", is one in which signals, physical communications, and/or logical communications may be sent and/or received. An operable connection may include a wireless interface, a physical interface, a data interface, and/or an electrical interface. For example, one or more of the components of FIG. 1 may be operably connected with one another, thereby facilitating communication therebetween.

"Mobile device", as used herein, is a computing device typically having a display screen with user input (e.g., touch, keyboard) and a processor for computing. Mobile devices include, but are not limited to, handheld devices, portable devices, remote devices, smartphones, smartwatches, key fobs, laptops, tablets, and e-readers.

The term "V2X", as used herein, may be used to describe "vehicle-to-everything" communications, and variations of V2X designations may depend on the intended user that is transmitting DSRC signals, and "V2V" may be used to describe "vehicle-to-vehicle" communications.

The term "infer" or "inference", as used herein, generally refers to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an exemplary component diagram of a system 100 for operation of an autonomous all-terrain vehicle (ATV), according to one aspect. The system 100 for operation of the autonomous ATV may include a controller 110 which includes a processor 112 and a memory 114, a location unit 120 including a global positioning system (GPS) unit 122, a navigation module 130, a sensor module 140 including different types of sensors (e.g., Light Detection and Ranging (LIDAR) sensor 142, image capture device 144, etc.), an interface module 150 which may include a display 152, hardware buttons 154, and/or software buttons 156, a communications module 160 including a dedicated short range communications (DSRC) module 162, and a drive controller 170 which controls different vehicle components. These modules and components may be operably connected and communicate among each other via a bus 172.

Figure 2:
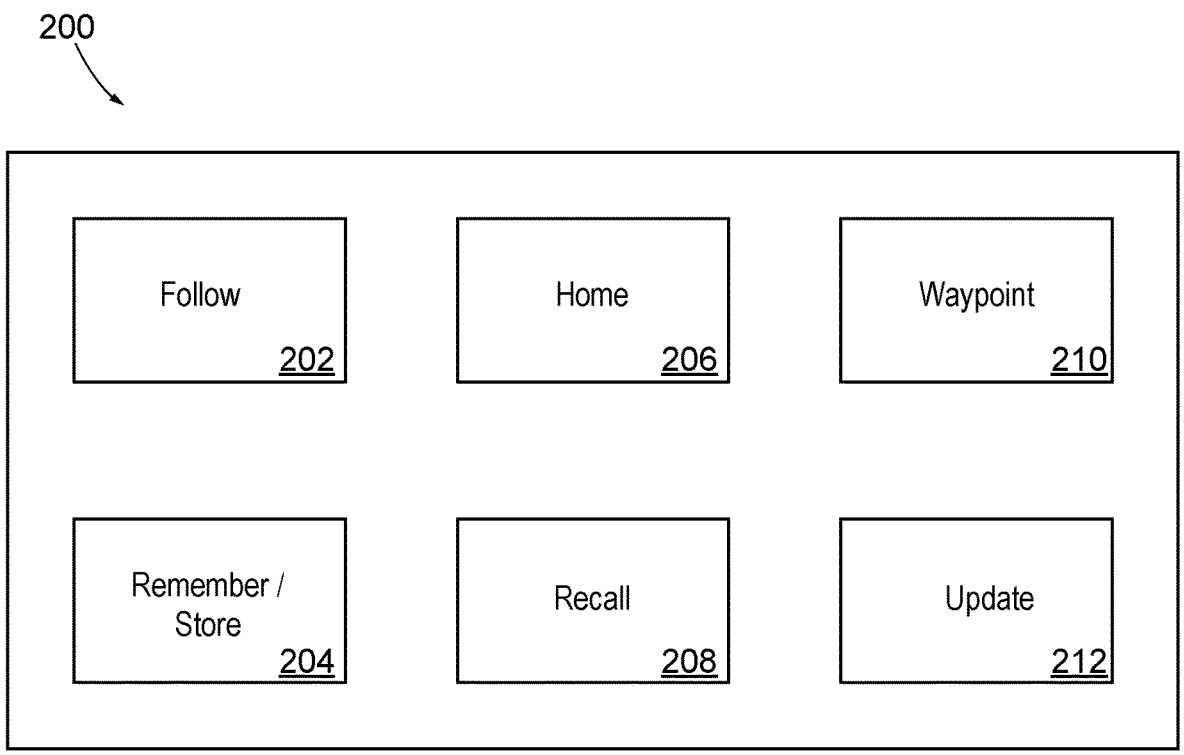
FIG. 2 is an illustration of an exemplary interface for the system for operation of the autonomous ATV of FIG. 1.

The interface module 150 may include the display 152 (which may be a touchscreen display), a touchpad, a trackpad, a clickable touchpad, one or more hardware buttons, and/or software buttons. Stated another way, the interface module 150 may include one or more touch sensitive portions, pressure sensitive portions, clickable portions or clickable buttons, implemented as one or more buttons (e.g., a first button, a second button, etc.). With reference to FIG. 2, which will be described in greater detail below, examples of buttons may include a 'follow' button 202, a 'remember path' button 204, a 'home' button 206, a 'recall path' button 208, a 'waypoint' button 210, and an 'update' button 212.

A button of the interface module 150 may be implemented as a soft button within one of the touch sensitive portions of the display 152. In other words, a first button may be defined as a first subset of one of the touch sensitive portions. Similarly, a second button may be defined as a second subset of one of the touch sensitive portions. In this way, these 'soft' buttons may be defined by arbitrary boundaries within a touch sensitive or pressure sensitive portion of the display 152. Therefore, a user may make a selection with a soft button by pressing, tapping, or double tapping the corresponding touch or pressure sensitive portion or by providing a multi-finger user input, for example. Alternatively, respective buttons may be physical buttons implemented as hardware or hardware buttons on the autonomous ATV.

In any event, when a button is pressed, the interface module 150 may transmit a corresponding command, via the bus 172, to the controller 110 of the autonomous ATV. In this regard, the controller 110 may receive the corresponding command from the interface module 150 and facilitate execution of that command. Examples of commands which may be received from the interface module 150 include a 'follow' command, a 'remember path' command, a 'recall path' command, a 'home' command, a 'waypoint' command or a 'follow breadcrumb' command, an 'update' command, as will be described with reference to FIGS. 2-7 below.

The location unit 120 may include the GPS unit 122 and may determine a location or coordinates associated with the autonomous ATV. Additionally, the location unit 120 may determine a path being travelled by a leader device (or leader), such as in a scenario where the 'follow' button 202 is pressed. The location unit 120 may determine a location or coordinates associated with the path being travelled by the leader device in a variety of ways. In this way, as the leader (e.g., a user) travels around with the leader device, the autonomous ATV may follow the leader and/or the leader device in a snake-like fashion.

For example, according to one aspect, the location unit 120 may utilize sensor information from the image capture device 144 of the sensor module 140 to determine the location of the leader device or leader. In other words, the image capture device 144 (e.g., a camera or video camera) may be used to track the location of the leader and the location unit 120 may determine the location of the leader relative to the autonomous ATV based on the image capture information. For example, the image capture device 144 may identify an outline of an individual and/or corresponding movement as the leader to follow.

According to another aspect, the location unit 120 may determine the location or coordinates or the path being travelled by the leader device based on GPS coordinate information received from the leader device. Stated another way, the leader device may include its own GPS unit which may determine a location or coordinates associated with the leader device. The leader device may transmit this location or coordinate information to the communications module 160 of the autonomous ATV, which may relay this information to the location unit 120, via the bus 172.

Regardless, the location unit 120 may determine or receive information, such as coordinate information, velocity, acceleration, trajectory, etc., associated with the path of the leader or the leader device (e.g., after the 'follow' button 202 is pressed). According to one aspect, the path may be 'closed' when the 'follow' button 202 is pressed a second time. In other words, the autonomous ATV may begin following the leader or leader device based on a first press of the 'follow' button 202 and stop following the leader or leader device based on a second press of the 'follow' button 202. A subsequent press of the 'remember path' button 204 may cause the controller 110 to store this path information to the memory 114 of the autonomous ATV for future or recall use. Alternatively, the 'remember path' button 204 may be pushed to initiate and/or terminate both the following and the storing of the path information associated with the leader or leader device. According to yet another aspect, the 'follow' button 202, when pressed, initiates automatic storage of the path information to the memory 114 of the autonomous ATV, thereby resulting in a first route being set as a first preset route without any other or additional user input.

The navigation module 130 may determine the first route for the autonomous ATV based on the location or coordinate information associated with the path (travelled by or being travelled by) the leader or the leader device, such as when the 'follow' command or the 'remember path' command is provided to the controller 110. The navigation module 130 may store the first route taken by the autonomous ATV to the memory 114 as a first preset route based on a received 'remember path' command. When the 'recall path' command is provided to the controller 110 from the interface module 150, the navigation module 130 may determine a second route for the autonomous ATV based on the received 'recall path' command and the stored first preset route. The navigation module 130 may query the drive controller 170 during the storing of the first route as the first preset route to store driving parameters from the drive controller 170 associated with the first route to the memory 114. Examples of driving parameters associated with vehicle components (e.g., power steering 174, throttle 176, brakes 178, etc.) include coordinate information, velocity, acceleration, trajectory, yaw rate, steering angle, throttle angle, etc.

According to one aspect, the second route may be shaped identically to the first route. Stated another way, the navigation module 130 may facilitate 'recall path' functionality when a first preset route is stored and when the 'recall path' command is received. Aspects related to the 'recall path' command will be described in greater detail with reference to FIGS. 2-5 below.

The navigation module 130 may generate one or more commands or signals for the drive controller 170 to implement aspects of autonomous driving. For example, as the second route is being recalled (e.g., based on a press of the 'recall path' button 208), the autonomous ATV may initiate a recall or re-execution of the first route. The navigation module 130 may replicate one or more of the driving parameters for one or more of the associated vehicle components. In other words, the navigation module 130 may retrieve the respective driving parameters for the corresponding vehicle components from the memory 114 of the autonomous ATV and implement these as one or more driving maneuvers, thereby 'matching' the coordinate information, velocity, acceleration, trajectory, yaw rate, steering angle, throttle angle, etc. between the first route and the second route, which is stored as the first preset route.

The sensor module 140 may include different types of sensors, such as a Light Detection and Ranging (LIDAR) sensor 142, the image capture device 144, a radar sensor, etc. Regardless, the sensor module 140 may sense or detect an obstacle around the autonomous ATV. If the sensor module 140 detects an obstacle which is obstructing a path associated with the autonomous ATV, the navigation module 130 may, in response, modify a route or current route of the autonomous ATV to navigate around the detected obstacle, thereby enabling the sensor module 140 to identify potential paths from a current location associated with the autonomous ATV to a current location of the leader or leader device.

In other words, when the sensor module 140 detects the obstacle in an operating environment through which the autonomous ATV is travelling, the navigation module 130 determines whether the obstacle impedes a current route of the autonomous ATV. Stated another way, the navigation module 130 may determine an alternative current route for the autonomous ATV based on the current route, whether the obstacle impedes the current route of the autonomous ATV, and a feature of the operating environment (e.g., topology, whether the terrain is passable, weather, ground conditions, ice thickness associated with a body of water, difficulty associated with an alternative route, etc.).

In this regard, as the autonomous ATV is travelling along the second route based on a received 'recall path' command, if the sensor module 140 detects an obstacle which is obstructing a current path or current route associated with the autonomous ATV, the navigation module 130 may modify the current route by generating an alternative current route so that no collision with the obstacle occurs. Therefore, in these scenarios, the second route may be shaped substantially identically to the first route but not necessarily exactly identical. It will be appreciated that the navigation module 130 may modify the current route as the first route is being recorded or remembered or as the second route (e.g., associated with the first preset route or associated with the 'recall path' command is being re-created or executed).

The communications module 160 may include the DSRC module 162, an antenna, a receiver, a transmitter, and/or a transceiver. The communications module 160 may receive information from external sources, such as another vehicle 182 (e.g., thereby facilitating V2V communications), a server 184 (e.g., thereby facilitating V2X communications), a remote device 186, which may be the leader device, etc. For example, the communications module 160 may receive the location data or path information associated with the leader device from the leader device. As another example, the communications module 160 may receive obstacle or environment information associated with the operating environment from the other vehicle or map information from the server 184. In this way, the communications module 160 may receive a variety of information from different sources.

As previously discussed, the drive controller 170 may be queried during the 'remember path' command and driving parameters may be stored to the memory 114 of the autonomous ATV in association with the route being set as the preset route. Similarly, during recall of the preset route (e.g., based on the 'recall path' command), these driving parameters may be recalled from the memory 114 and implemented by the driving controller to enable the autonomous ATV to mimic the first preset route using the driving parameters associated with the route where the 'remember path' command was implemented. In this way, the drive controller 170 may receive the driving parameters from one or more vehicle components or from the sensor module 140, store the corresponding driving parameters, and implement the respective driving parameters at a later time, upon prompt by the 'recall path' command or a press of the 'recall path' button.

FIG. 2 is an illustration of an exemplary interface for the system 100 for operation of the autonomous ATV. The interface 200 of FIG. 2 may be implemented via the interface module 150 of the system 100 for operation of the autonomous ATV, such as via the display 152, for example. According to one aspect, the interface, as implemented on a touch screen, may include one or more software buttons. Examples of commands associated with these buttons may include the 'follow' command associated with the 'follow' button 202, the 'remember path' command associated with the 'remember path' button 204 or store path button, the 'recall path' command associated with the 'recall path' button 208, the 'home' command associated with the 'home' button 206, the 'waypoint' command or the 'follow breadcrumb' command associated with the 'waypoint' button 210, and the 'update' command associated with the 'update' button 212. According to another aspect, the interface of FIG. 2 may be implemented using hardware buttons rather than software buttons (or a combination thereof). Further, the interface of FIG. 2 may be implemented on the autonomous ATV, on the remote device 186, or on both.

Figure 3:
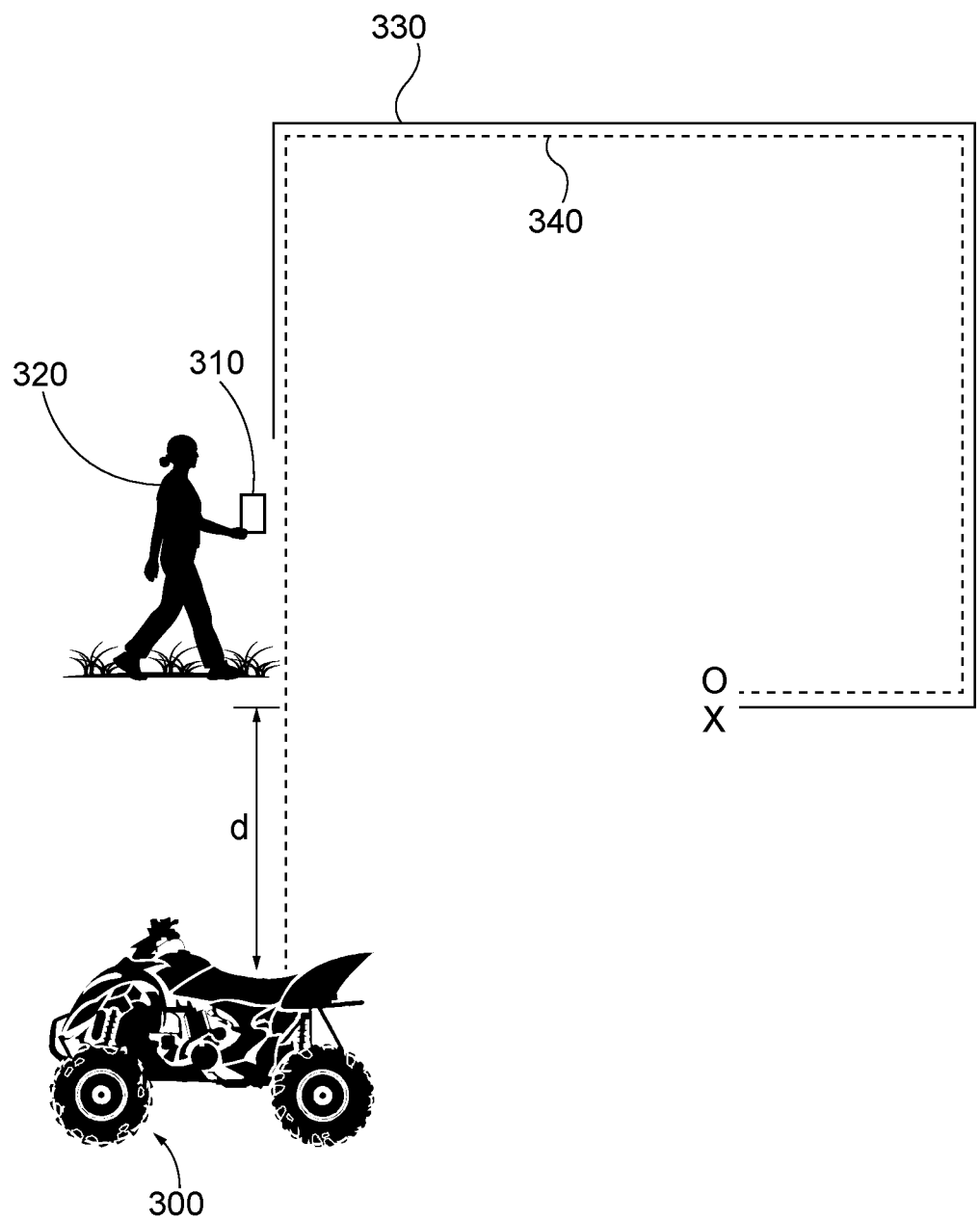
FIG. 3 is an illustration of an exemplary usage scenario for the system for operation of the autonomous ATV of FIG. 1.

FIG. 3 is an illustration of an exemplary usage scenario for the system 100 for operation of an autonomous ATV 300 (which may be the same autonomous ATV as the autonomous ATV described with reference to FIG. 1). According to one aspect, when the 'follow' button 202 on the interface of FIG. 2 is pressed, the controller 110 receives the 'follow' command. According to another aspect, the 'follow' command may be provided from the remote device 186, which may be a handheld device, portable device, smartphone, smartwatch, key fob, laptop, tablet, e-reader, etc. The remote device 186 may act as a leader device 310 and include its own GPS unit which tracks a location or path associated with the mobile device. The remote device 186 may further include its own communications unit transmitting this GPS information to the communications module 160 of the autonomous ATV 300 or to the server 184, for example.

Regardless, when the 'follow' command is received, the location unit 120 of the system 100 for operation of the autonomous ATV 300 may determine a location associated with the autonomous ATV 300, and determine a path 330 or a location being travelled by the leader device 310 or a leader 320. As previously discussed, the sensor module 140 may include the image capture device 144 which facilitates tracking of the leader 320 (e.g., using image recognition to track the leader 320). According to other aspects, the communications module 160 may receive the location of the leader device 310 as the location of the leader 320 or receive the path 330 (e.g., and associated coordinates) being travelled, already travelled, or to be travelled by the leader device 310 and relay this information to the location unit 120.

The navigation module 130 may determine a first route 340 for the autonomous ATV 300 based on the path 330

(being travelled, already travelled, or to be travelled) associated with the leader device 310 or the leader 320. For example, the navigation module 130 may determine the first route 340 as a route substantially identical to the route associated with the leader device 310 or the leader 320. As depicted in FIG. 3, the autonomous ATV 300 may trail the leader device 310 or the leader 320 slightly to the right. According to one aspect, a second press of the 'follow' button 202 may change a current following distance 'd' (e.g., from the autonomous ATV 300 to the leader device 310 or the leader 320) from a first preset following distance to a second preset following distance. For example, a first press of the 'follow' button 202 may result in the controller 110 setting the current following distance 'd' to twenty feet. Subsequent presses of the 'follow' button 202 may cause the distance to be reduced by five foot intervals until a lower bound is reached, at which point the distance may be cycled (e.g., 20, 15, 10, 5, 20, 15, 10, 5, etc.) back to twenty feet again. According to other aspects, the increment or decrement distance may be manually set, using the interface module 150.

It will be appreciated that although portions of this description may refer to the route associated with the leader 320 or the route associated with the leader device 310, that reference to one generally includes reference to the other, depending on the sensor used to track the leader 320 and/or the leader device 310.

According to one aspect, when the 'remember path' button 204 is pressed, a 'follow' command and a 'remember path' command may be transmitted to (e.g., transmitted by the remote device 186 or the interface) and received by the controller 110. For example, the remote device 186 may transmit the ' 'remember path' command' to the communications module 160 of the autonomous ATV 300, which may relay this 'remember path' command to the controller 110. In this way, the navigation module 130 may store the route (e.g., the first route 340 described above) as a preset route in the memory 114 of the autonomous ATV 300. Stated another way, the navigation module 130 may determine the first route 340 for the autonomous ATV 300 based on the path 330 being travelled by the leader device 310 and store the first route 340 for the autonomous ATV 300 as a first preset route based on the 'remember path' command.

The memory 114 of the autonomous ATV 300 may be configured to store a number of preset routes (e.g., a first preset route, a second preset route, a third preset route, etc.). Thus, if the first route 340 is already associated with a stored route, the navigation module 130 may store the corresponding route for the autonomous ATV 300 as the second preset route. Further, a first press of the 'recall path' button 208 may be utilized to initiate a recall of the first preset route, while a second, subsequent press (within a threshold time period of the first press, similarly to a double tap) of the 'recall path' button 208 may be utilized to initiate a recall of the second preset route, and so forth.

Figure 4:
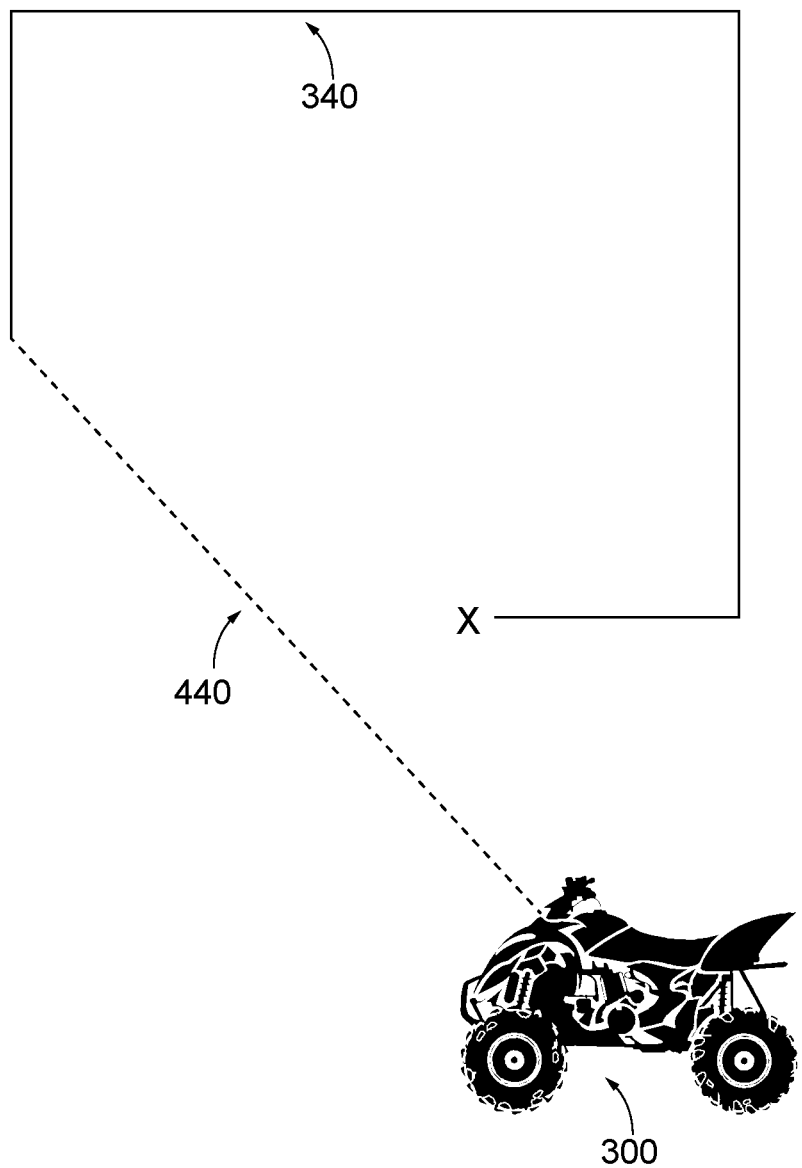
FIG. 4 is an illustration of an exemplary usage scenario for the system for operation of the autonomous ATV of FIG. 1.
Figure 5:
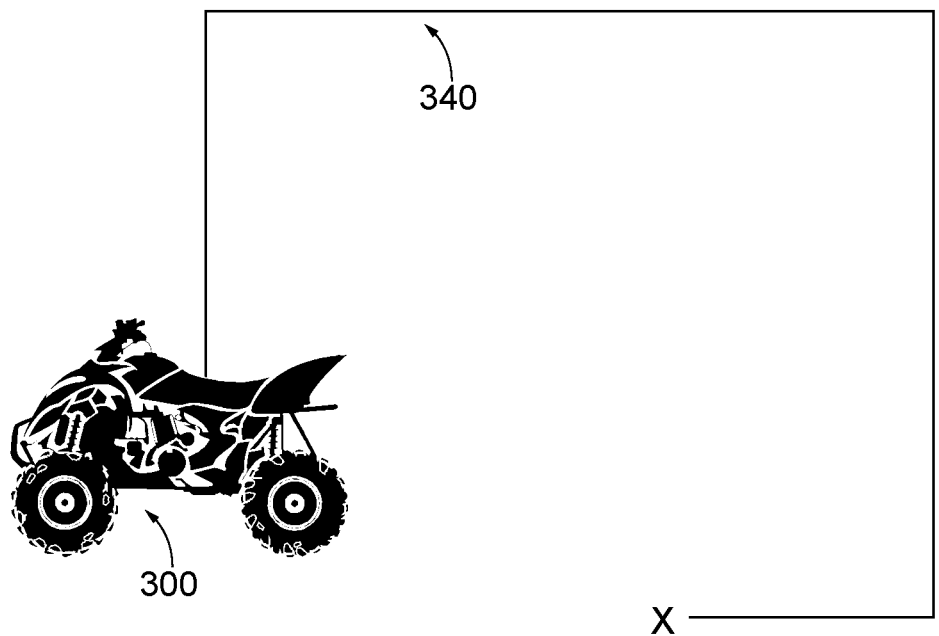
FIG. 5 is an illustration of an exemplary usage scenario for the system for operation of the autonomous ATV of FIG. 1.

FIGS. 4-5 are illustrations of an exemplary usage scenario for the system 100 for operation of the autonomous ATV 300. When the 'recall path' button 208 is pressed (e.g., either on the interface of the remote device 186 or on the interface of the autonomous ATV 300), a 'recall path' command is sent or transmitted to the controller 110. In response to the controller 110 receiving the 'recall path' command, the navigation module 130 determines a second route for the autonomous ATV 300 based on the received 'recall path' command and the stored first preset route. Examples of this second route are depicted in FIGS. 4-5. In FIG. 4, the second route has identical coordinates to the first route 340 originally travelled by the leader and/or leader device. In other words, the autonomous ATV 300 is commanded by the navigation module 130 to travel to the same start point 440 prior to initiating the 'recall path' command. In FIG. 5, the second route is merely shaped identically to the first route 340. Further, according to the aspect depicted by FIG. 5, the autonomous ATV 300 initiates the 'recall path' command beginning at a current location of the autonomous ATV 300 (e.g., rather than travelling to the same start point 440 as the first route 340).

According to one aspect, the navigation module 130 may scale the second route based on one or more geographical considerations, such as based on map or obstacle data obtained from the server 184 via the communications module 160 or the sensor module 140, for example. In other words, if the autonomous ATV 300 is contained within a fenced area, the navigation module 130 may determine the second route based on boundaries defined by the fences. For example, if the first route is a 100 foot×100 foot square, and the map data or sensor data obtained from the communications module 160 or the sensor module 140 indicates that the autonomous ATV 300 is located within a fenced area which is a 90 foot×90 foot square, when the 'recall path' command is received by the controller 110 (e.g., the 'recall path' button 208 is pressed), the navigation module 130 may determine the second route to be a 80 foot×80 foot square (e.g., thereby scaling the original or first route to a different scale by a factor of 0.8), for example, while allowing for clearance near the fence for turns. According to other aspects, the interface may enable a user to input a desired scale factor. The scale factor may be applied to one or more of the driving parameters (e.g., acceleration, velocity, etc.) as well.

In any event, the controller 110 may control the drive controller 170 of the autonomous ATV 300 and cause the autonomous ATV 300 to travel the second route determined by the navigation module 130. For example, the navigation module 130 may retrieve one or more driving parameters associated with the first route from the memory 114 of the autonomous ATV 300. Examples of driving parameters which may be stored in the memory 114 include coordinate information, velocity, acceleration, trajectory, yaw rate, steering angle, throttle angle, etc.

The drive controller 170 may implement these driving parameters with respect to their corresponding vehicle components to facilitate autonomous driving by recalling or re-executing the driving associated with the first route via the first preset route using the one or more of the driving parameters associated with the first route while travelling the first preset route. In other words, the navigation module 130 may retrieve the respective driving parameters for the corresponding vehicle components from the memory 114 of the autonomous ATV 300 and command the drive controller 170 to implement these as one or more driving maneuvers, thereby 'matching' the coordinate information, velocity, acceleration, trajectory, yaw rate, steering angle, throttle angle, etc. between the first route and the second route (stored as the first preset route).

Figure 6:
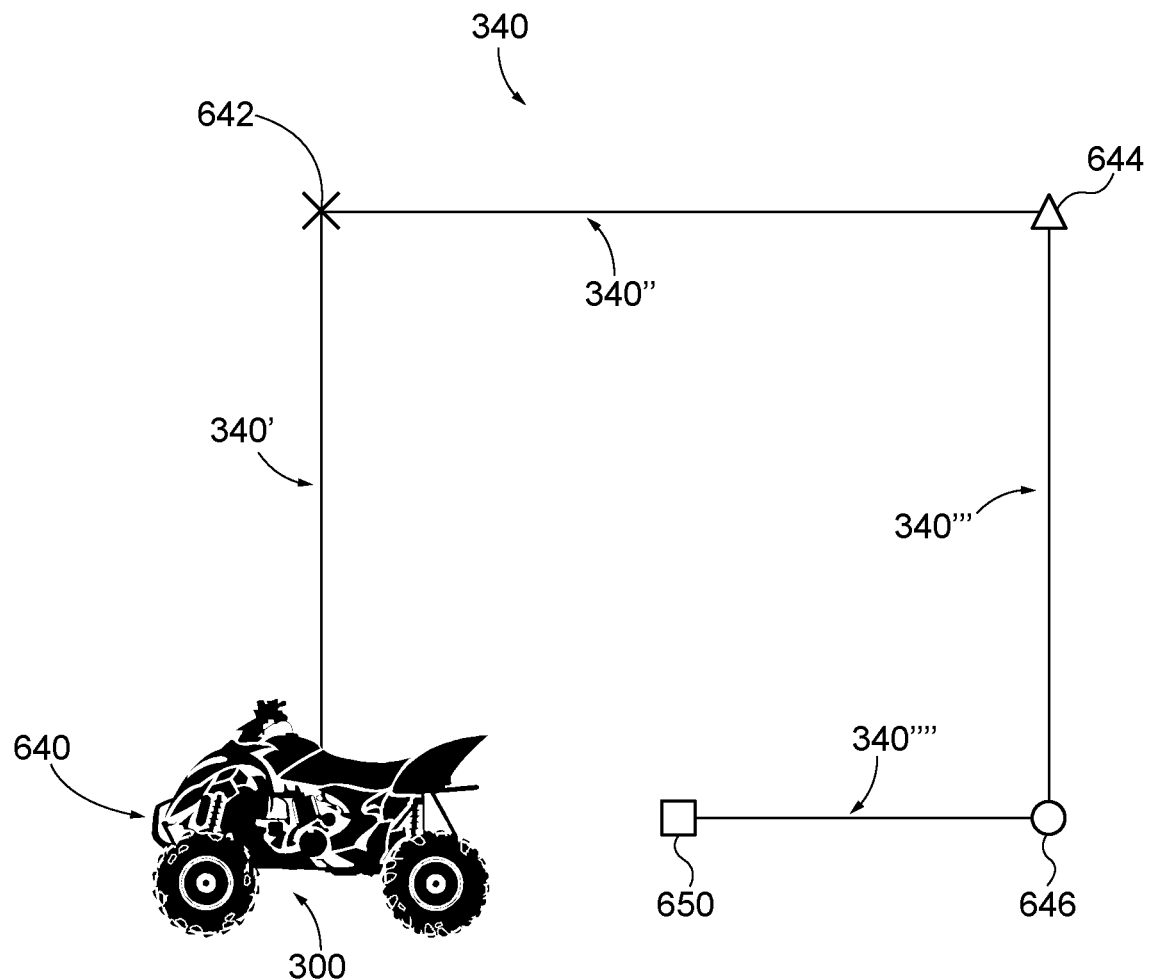
FIG. 6 is an illustration of an exemplary usage scenario for the system for operation of the autonomous ATV of FIG. 1.

FIG. 6 is an illustration of an exemplary usage scenario for the system 100 for operation of the autonomous ATV 300. According to one aspect, one or more waypoints may be set. For example, a waypoint may be manually entered, marked by the remote device 186 on location, such as when the leader or leader device is travelling along the first route 340. In any event, these waypoints or digital 'breadcrumbs' may be stored on the server 184 or downloaded to the memory 114 of the autonomous ATV 300. During recall (e.g., upon pressing of the 'waypoint' button 210), the navigation module 130 may command drive controller of the autonomous ATV 300 to autonomously navigate from waypoint to waypoint (e.g., from a first waypoint 642 to a second waypoint 644 to a third waypoint 646, etc.).

For example, in FIG. 6, upon a first press of the 'waypoint' button 210, the autonomous ATV 300 may autonomously navigate along 340' from a first location 640 to the first waypoint 642. A second, subsequent press of the 'waypoint' button 210 map result in the autonomous ATV 300 autonomously navigating along 340" from the first waypoint 642 to the second waypoint 644. Yet another press of the 'waypoint' button 210 map result in the autonomous ATV 300 autonomously navigating along 340''' from the second waypoint 644 to the third waypoint 646. At the third waypoint 646, a press of the 'follow' button 202 map result in the autonomous ATV 300 autonomously navigating along 340''' to the location of the leader 650 or leader device from the third waypoint 646. In this way, the autonomous ATV 300 may be called on to follow a path 330 of a leader in a segment by segment manner.

Figure 7:
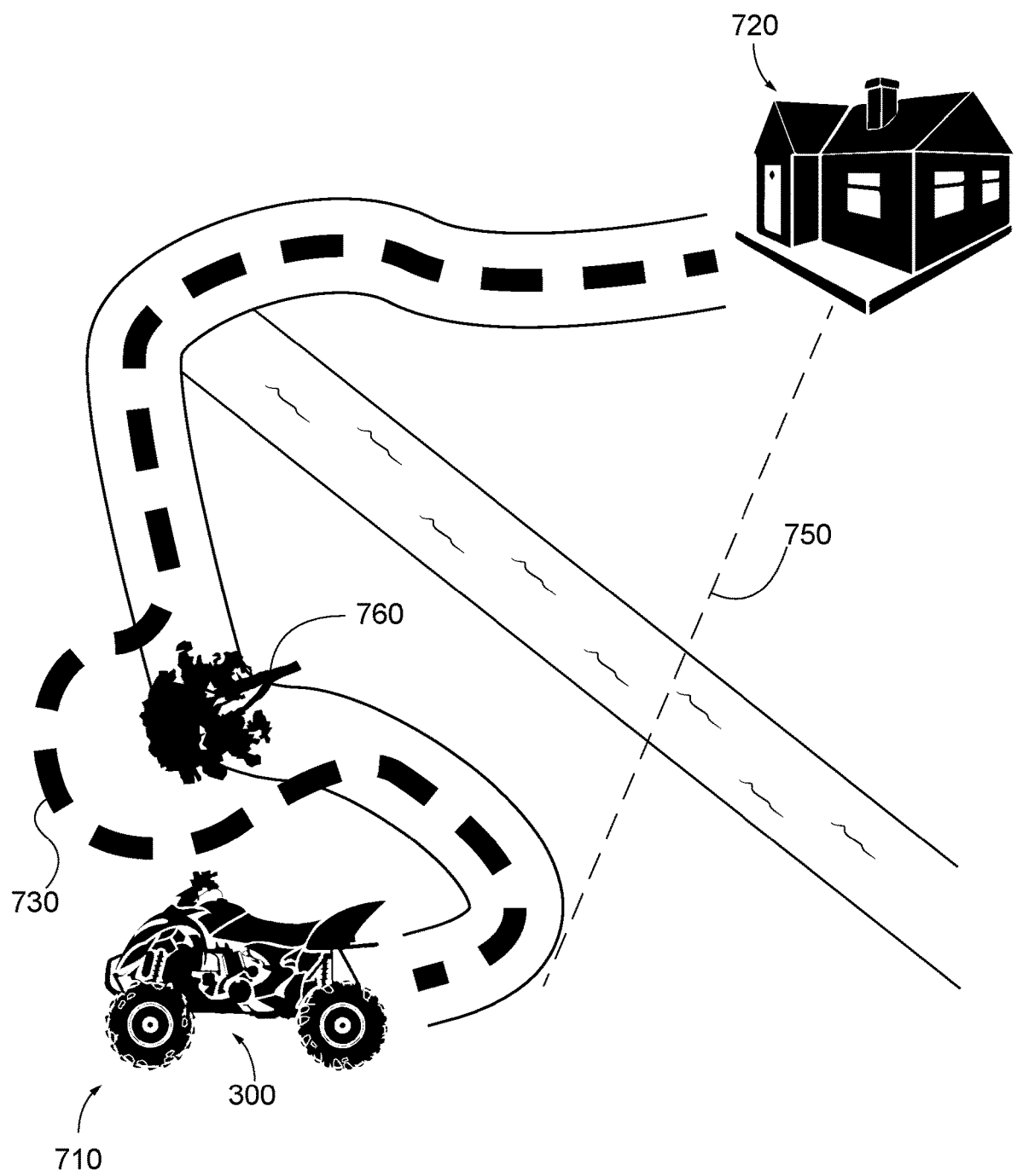
FIG. 7 is an illustration of an exemplary usage scenario for the system for operation of the autonomous ATV of FIG. 1.

FIG. 7 is an illustration of an exemplary usage scenario for the system 100 for operation of the autonomous ATV 300. When the 'home' button 206 is pressed, the navigation module 130 generates a route from a current location 710 of the autonomous ATV 300 to a predetermined home location 720. If no home location is predefined, the autonomous ATV 300 may prompt the user for a home location using the interface module 150 or via the remote device 186. For example, if the autonomous ATV 300 is following a user, after the user has found an object of interest and loaded that object onto the autonomous ATV 300, autonomous ATV 300 may be programmed to automatically go back to a designated spot labelled as home. Home may be the vehicle where autonomous ATV 300 was loaded or unloaded (e.g., a trailer or truck or based on ignition on). As another example, home may be a fixed location, such as a barn or a shed. According to other aspects, home may be moving such that it is not a designated spot (e.g., a location based on a second leader or second leader device). Based on the maps information received via the communications module 160 or via the sensor module 140, the navigation module 130 may generate different routes for travel. For example, if a creek is iced over or known to have a shallow depth which is passable, the navigation module 130 may generate a more direct route 750, while other routes 752 may be generated if the more direct route is considered difficult or impassable or based on detected obstacles 760.

The controller 110 of the autonomous ATV 300 may detect one or more hardware configurations associated with the autonomous ATV 300. For example, different hardware configurations may be provided on top of a base of the autonomous ATV 300, such as different fruit picking devices which may use different types of software to run or operate. In this regard, over the air (OTA) updated may be provided based on detected hardware configurations (e.g., fruit picking hardware, etc.). For example, the 'update' button 212, when pressed, may transmit a check hardware configuration command to the controller 110. The controller 110 may identify any additional hardware installed on the autonomous ATV 300, availability of network connectivity, and whether updates are recommended or if the latest software or firmware for the associated hardware is already installed on the autonomous ATV 300. If updates are recommended, the controller 110 may have the communications module 160 receive the updates from the server 184 and install respective updates accordingly.

Figure 8:
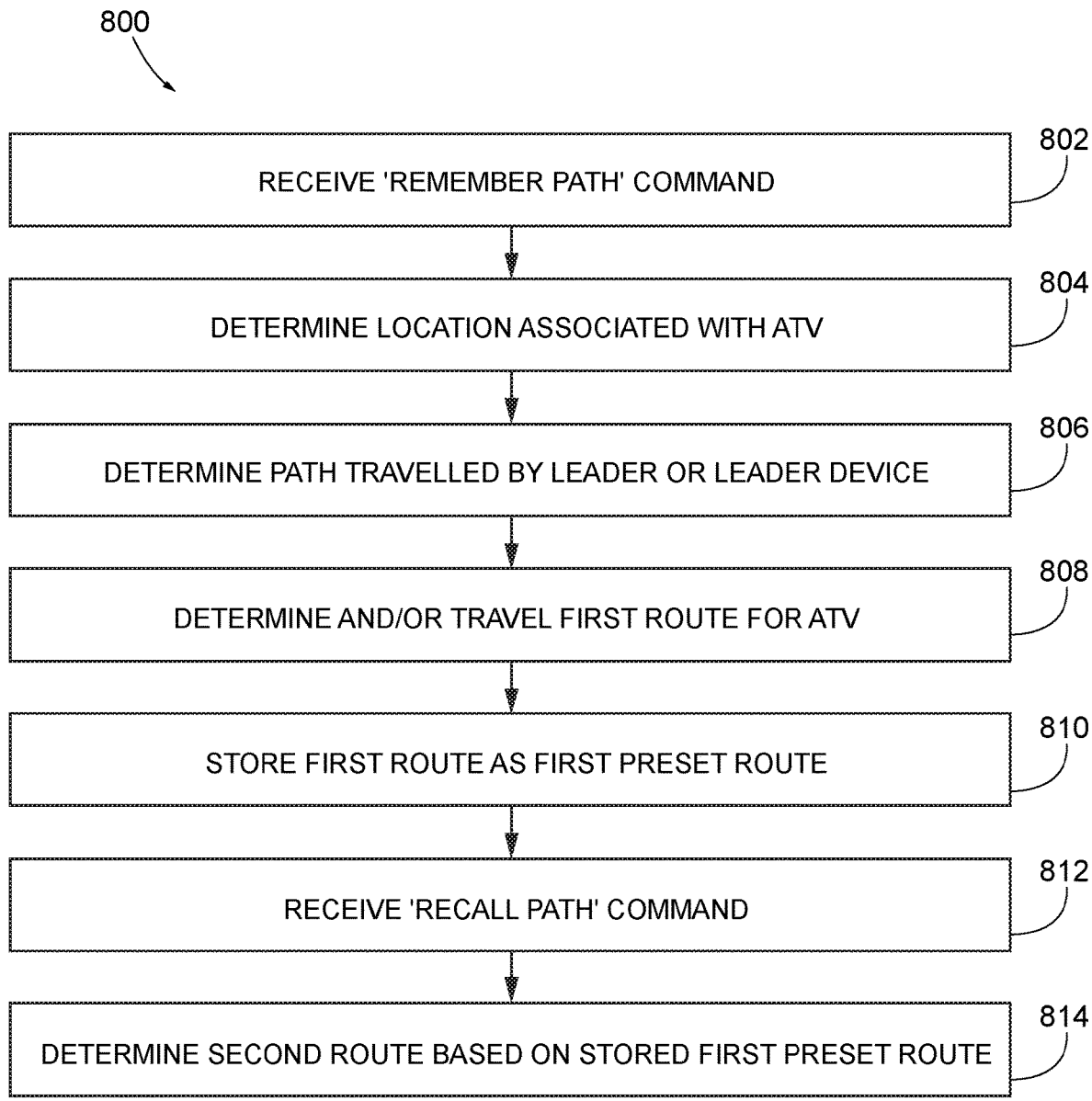
FIG. 8 is an illustration of an exemplary flow diagram of a method for operation of an autonomous ATV, according to one aspect.

FIG. 8 is an illustration of an exemplary flow diagram of a method for operation of an autonomous ATV 300, according to one aspect. At 802, a 'remember path' command is received, such as by the controller 110. At 802, a location associated with the autonomous ATV 300 is determined, such as by the location unit 120. At 806, a path 330 travelled by the leader or leader device is determined (e.g., by the communications module 160 or the sensor module 140). At 808, a first route is determined and travelled by the autonomous ATV 300, as provided by the navigation module 130 and/or the drive controller 170. At 810, the first route is stored as a first preset route, such as when the 'remember path' button 204 is pressed. At 812, when the 'recall path' command is received by the controller 110, the second route is determined 814 (e.g., and may be implemented via the drive controller 170) based on the first preset route which is stored.

Figure 9:
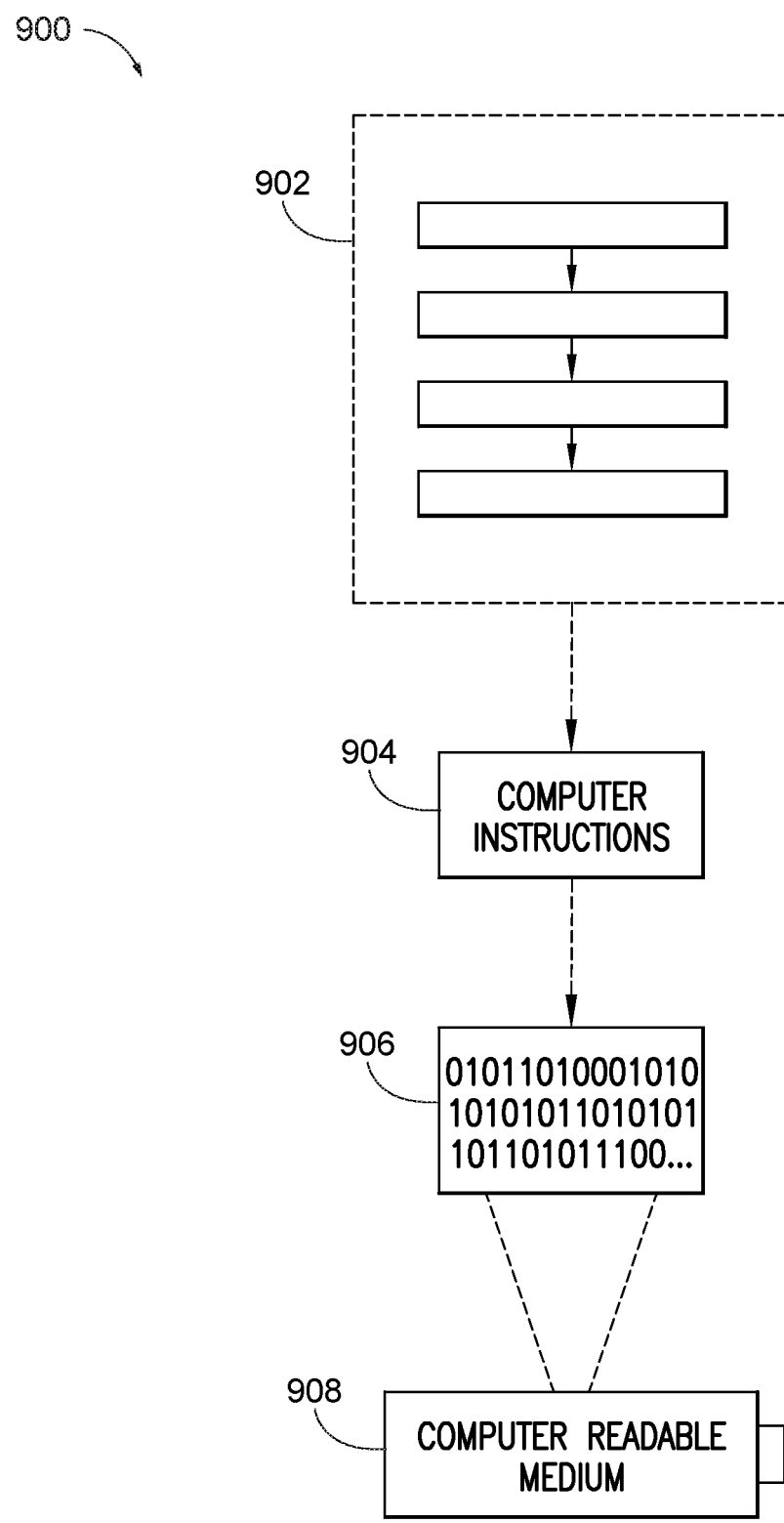
FIG. 9 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An embodiment of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This encoded computer-readable data 906, such as binary data including a plurality of zero's and one's as shown in 906, in turn includes a set of processor-executable computer instructions 904 configured to operate according to one or more of the principles set forth herein. In one such aspect 900, the processor-executable computer instructions 904 may be configured to perform a method 902, such as the method 800 of FIG. 8. In another aspect, the processor-executable computer instructions 904 may be configured to implement a system, such as the system 100 of FIG. 1. Many such computer-readable media may be devised by those of ordinary skill in the art that are configured to operate in accordance with the techniques presented herein.

As used in this application, the terms "component", "module", "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
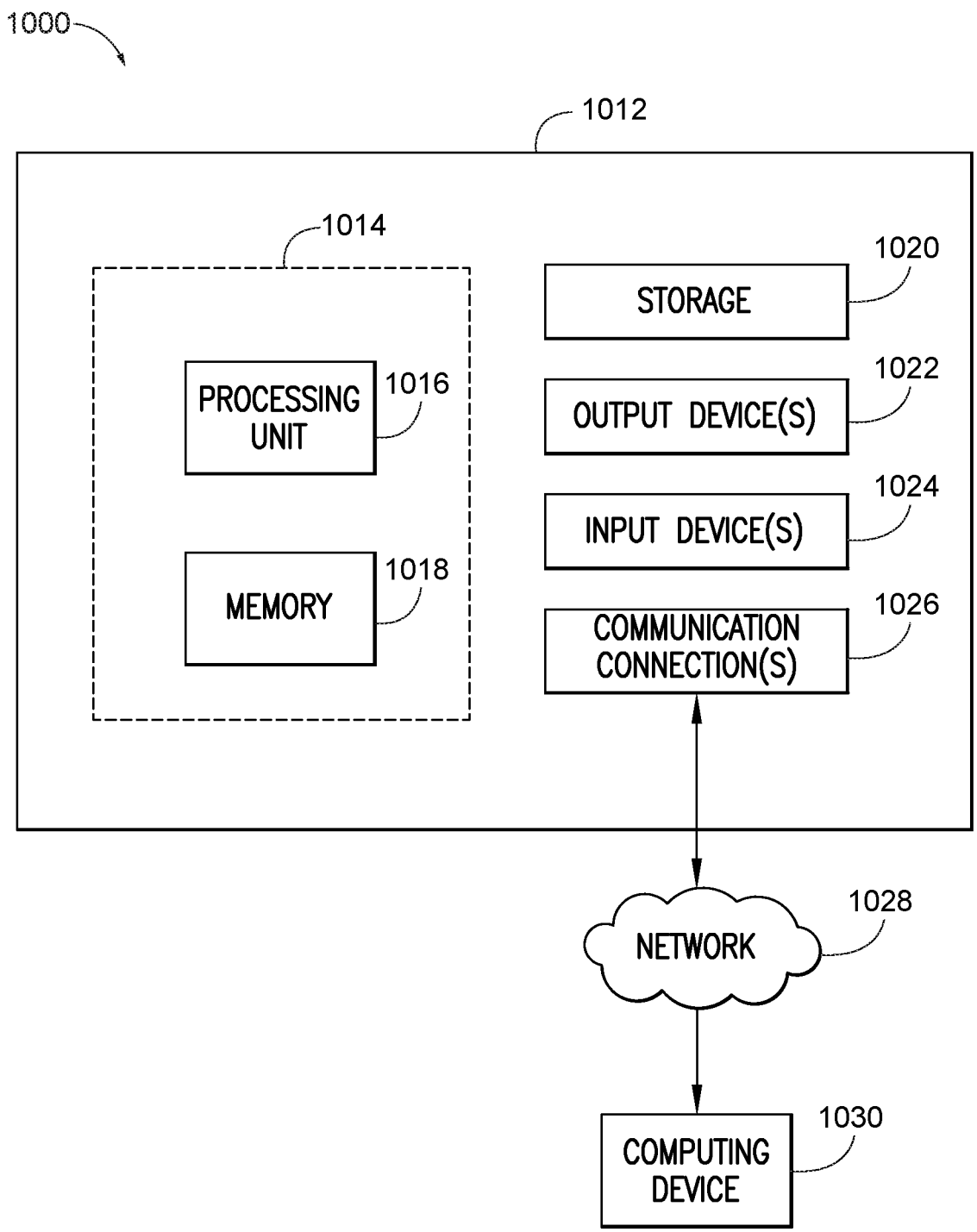
FIG. 10 is an illustration of an example computing environment where one or more of the provisions set forth herein are implemented, according to one aspect.

FIG. 10 and the following discussion provide a description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one aspect provided herein. In one configuration, computing device 1012 includes at least one processing unit 1016 and memory 1018. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other embodiments, computing device 1012 includes additional features or functionality. For example, computing device 1012 may include additional storage such as removable storage or non-removable storage, including, but not limited to, magnetic storage, optical storage, etc. Such additional storage is illustrated in FIG. 10 by storage 1020. In one aspect, computer readable instructions to implement one aspect provided herein are in storage 1020. Storage 1020 may store other computer readable instructions to implement an operating system, an application program, etc. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 1012. Any such computer storage media is part of computing device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with computing device 1012. Input device(s) 1024 and output device(s) 1022 may be connected to computing device 1012 via a wired connection, wireless connection, or any combination thereof. In one aspect, an input device or an output device from another computing device may be used as input device(s) 1024 or output device(s) 1022 for computing device 1012. Computing device 1012 may include communication connection(s) 1026 to facilitate communications with one or more other devices 1030, such as through network 1028, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous all-terrain vehicle (ATV), comprising:
   a controller, implemented via a processor and a memory, receiving a 'remember path' command;
   a location unit, implemented as GPS hardware:
   determining a location associated with the autonomous ATV; and
   determining a path being travelled by a leader device; and a navigation module, implemented via the processor:
   determining a first route for the autonomous ATV based on the path being travelled by the leader device; and
   storing the first route for the autonomous ATV as a first preset route based on the received 'remember path' command,
wherein the controller receives a 'recall path' command,
wherein the navigation module determines a second route for the autonomous ATV based on the received 'recall path' command and the stored first preset route, and
wherein the controller controls a drive controller of the autonomous ATV based on the determined second route shaped identically to the first route from a start location different than the location associated with the autonomous ATV during the 'remember path' training, and
wherein the drive controller executes the determined second route to move the ATV along the determined second route.

2. The autonomous ATV of claim 1, comprising a sensor module detecting an obstacle in an operating environment through which the autonomous ATV is travelling,
   wherein the navigation module determines whether the obstacle impedes a current route of the autonomous ATV.

3. The autonomous ATV of claim 2, wherein the navigation module determines an alternative current route for the autonomous ATV based on the current route, whether the obstacle impedes the current route of the autonomous ATV, and a feature of the operating environment.

4. The autonomous ATV of claim 3, wherein the current route is the first route or a second route associated with a 'recall path' command.

5. The autonomous ATV of claim 2, wherein the sensor module includes a light detection and ranging (LIDAR) sensor.

6. The autonomous ATV of claim 1, wherein the location unit includes a global positioning system (GPS) unit.

7. The autonomous ATV of claim 1, comprising a hardware button associated with the 'remember path' command and a hardware button associated with a 'recall path' command.

8. The autonomous ATV of claim 1, comprising a hardware button associated with a 'follow' command, wherein the navigation module determines the first route for the autonomous ATV based on receiving the 'follow' command.

9. An autonomous all-terrain vehicle (ATV), comprising:
an interface including a button associated with a 'remember path' command;
a controller, implemented via a processor and a memory, receiving the 'remember path' command based on a press of the button;
a location unit, implemented as GPS hardware:
   determining a location associated with the autonomous ATV; and
   determining a path being travelled by a leader device; and
a navigation module, implemented via the processor:
   determining a first route for the autonomous ATV based on the path being travelled by the leader device; and
   storing the first route for the autonomous ATV as a first preset route based on the received 'remember path' command,
wherein the controller receives a 'recall path' command,
wherein the navigation module determines a second route for the autonomous ATV based on the received 'recall path' command and the stored first preset route, and
wherein the controller controls a drive controller of the autonomous ATV based on the determined second route shaped identically to the first route from a start location different than the location associated with the autonomous ATV during the 'remember path' training, and
wherein the drive controller executes the determined second route to move the ATV along the determined second route.

10. The autonomous ATV of claim 9, comprising a sensor module detecting an obstacle in an operating environment through which the autonomous ATV is travelling,
   wherein the navigation module determines whether the obstacle impedes a current route of the autonomous ATV.

11. The autonomous ATV of claim 10, wherein the navigation module determines an alternative current route for the autonomous ATV based on the current route, whether the obstacle impedes the current route of the autonomous ATV, and a feature of the operating environment.

12. An autonomous all-terrain vehicle (ATV), comprising:
a communications module receiving a 'remember path' command from a remote device;
a controller, implemented via a processor and a memory, receiving the 'remember path' command from the communications module;
a location unit, implemented as GPS hardware:
   determining a location associated with the autonomous ATV; and
   determining a path being travelled by a leader device; and
a navigation module, implemented via the processor:
   determining a first route for the autonomous ATV based on the path being travelled by the leader device; and
   storing the first route for the autonomous ATV as a first preset route based on the received 'remember path' command,
wherein the controller receives a 'recall path' command,
wherein the navigation module determines a second route for the autonomous ATV based on the received 'recall path' command and the stored first preset route, and
wherein the controller controls a drive controller of the autonomous ATV based on the determined second route shaped identically to the first route from a start location different than the location associated with the autonomous ATV during the 'remember path' training, and
wherein the drive controller executes the determined second route to move the ATV along the determined second route.

13. The autonomous ATV of claim 12, comprising a sensor module detecting an obstacle in an operating environment through which the autonomous ATV is travelling,
   wherein the navigation module determines whether the obstacle impedes a current route of the autonomous ATV.

14. The autonomous ATV of claim 13, wherein the navigation module determines an alternative current route for the autonomous ATV based on the current route, whether the obstacle impedes the current route of the autonomous ATV, and a feature of the operating environment.

15. The autonomous ATV of claim 14, wherein the current route is the first route or a second route associated with a 'recall path' command.

* * * * *